(12) United States Patent
Chrysanthakopoulos

(10) Patent No.: US 7,412,667 B2
(45) Date of Patent: Aug. 12, 2008

(54) WEB SERVICE VISUALIZER AND DISPLAY SERVICE

(75) Inventor: Georgios Chrysanthakopoulos, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 694 days.

(21) Appl. No.: 10/892,567

(22) Filed: Jul. 15, 2004

(65) Prior Publication Data

US 2006/0015824 A1    Jan. 19, 2006

(51) Int. Cl.
*G06F 3/00* (2006.01)
(52) U.S. Cl. .................. 715/853; 715/836; 715/835; 715/734; 715/854; 709/224
(58) Field of Classification Search ............... 715/835, 715/734, 836, 853, 854; 709/224
See application file for complete search history.

(56) References Cited

U.S. PATENT DOCUMENTS

| | | | | |
|---|---|---|---|---|
| 5,960,199 | A * | 9/1999 | Brodsky et al. | 717/128 |
| 6,647,432 | B1 * | 11/2003 | Ahmed et al. | 719/318 |
| 6,731,314 | B1 * | 5/2004 | Cheng et al. | 715/848 |
| 6,996,778 | B2 * | 2/2006 | Rajarajan et al. | 715/734 |
| 2003/0005132 | A1 * | 1/2003 | Nguyen et al. | 709/229 |
| 2003/0014733 | A1 * | 1/2003 | Ringseth et al. | 717/116 |
| 2003/0067912 | A1 * | 4/2003 | Mead et al. | 370/389 |
| 2003/0083903 | A1 * | 5/2003 | Myers | 705/2 |
| 2003/0163513 | A1 * | 8/2003 | Schaeck et al. | 709/201 |
| 2003/0184580 | A1 * | 10/2003 | Kodosky et al. | 345/734 |
| 2003/0225876 | A1 * | 12/2003 | Oliver et al. | 709/224 |
| 2004/0030740 | A1 * | 2/2004 | Stelting | 709/201 |
| 2004/0046785 | A1 * | 3/2004 | Keller | 345/734 |
| 2004/0093518 | A1 * | 5/2004 | Feng et al. | 713/201 |
| 2004/0098732 | A1 * | 5/2004 | Clement et al. | 719/328 |
| 2004/0107125 | A1 * | 6/2004 | Guheen et al. | 705/7 |
| 2004/0133876 | A1 * | 7/2004 | Sproule | 717/105 |
| 2004/0243944 | A1 * | 12/2004 | Sabiers et al. | 715/853 |

* cited by examiner

*Primary Examiner*—Weilun Lo
*Assistant Examiner*—Tuyetlien T Tran
(74) *Attorney, Agent, or Firm*—Workman Nydegger

(57) ABSTRACT

Described is a service visualizer that presents a high-level view of services currently running in a distributed operating system. The service visualizer, which itself may be a service, is visual-based and uses objects (e.g., spheres) suspended in space to represent the ports of services that are currently running. Messages sent between services are represented by particles. The visualizer creates a visual collection for each service port, which in turn creates a port monitor to watch for messages on the port. The resulting visualization may be interacted with, such as for purposes of debugging.

39 Claims, 9 Drawing Sheets

WEB SERVICE VISUALIZER AND DISPLAY SERVICE

FIELD OF THE INVENTION

The invention relates generally to computer systems and networks, and more particularly to web services.

BACKGROUND OF THE INVENTION

There are many types of computing services, resources and data that computer users and applications need to manage and otherwise access. Such resources and data include services and data maintained locally, and data maintained on corporate networks and other remotely accessible sites including intranets and the internet.

The concept of web services is generally directed to providing a computing service to clients via protocols and standards that are cross-platform in nature. In general, web services provide the basic tools for wiring the nodes of a distributed application together, regardless of the type of platform on which the requesting client is running. As there are many different computing platforms, various platform-independent mechanisms and protocols that facilitate the exchange of network information are becoming commonplace in web services, including HTTP (HyperText Transfer Protocol), XML (extensible Markup Language), XML Schema, and SOAP (Simple Object Access Protocol) XML. Traditional web services, in which businesses, organizations, and other providers offer services to users and applications, are presently based on these standards. Moreover, as described in U.S. patent application Ser. No. 10/328,714, assigned to the assignee of the present invention, a web service can represent other types of resources, such as hardware devices, databases and the like.

U.S. patent application Ser. No. 10/856,399, assigned to the assignee of the present invention and herein incorporated by reference in its entirety, describes an application model a method, system and mechanism including a web services application protocol (WSAP), that, among other things, formally represents the state and behavior of a service via a port, (e.g., URI), whereby the entities in a service may be contacted directly for interaction. In other words, unlike other protocols, WSAP describes the behaviors of a web service in a formalized manner, e.g., with each behavior of a service having its own port. The WSAP protocol also facilitates the usage of intermediaries by defining shared semantics on verbs, which identify what a message is, what the processing of message is, and how it affects the state/behavior of the receiver. Further, the ordering of messages and operations provides context to what is occurring.

Given the complexities of a distributed operating system in which portions of the operating system execute on separate processors, many traditional tools do not work very well. For example, traditional stack-based debuggers are not well-suited for the message-based world of a distributed operating system, including that it is nearly impossible to set traditional breakpoints on multiple recursive copies of a service written to manipulate messages from, for example, fifty or so remote services. Furthermore, since these services are effectively black boxes, it is meaningless to "step into" or "set a breakpoint" inside a remote service running across a corporate trust boundary.

SUMMARY OF THE INVENTION

Briefly, the present invention provides a system and method for viewing the internals of a distributed operating system, as those internals execute. To this end, a visualizer service is provided that facilitates the viewing of other services, as well as any message passing that occurs between services.

In one embodiment, the system and method are incorporated into an application program that is constructed from a set of composed services to represent the real time messaging activities as a visual, three-dimensional animation on a display screen. For example, service URIs are represented as spherical balls in three-dimensional space, with particles used to represent messages being passed between services. In addition to viewing, interaction with the visualizer service allows access to the information corresponding to the displayed entities, e.g., a message as represented by a particle may be dragged/dropped into a debugging environment, e.g., in another window.

In one example implementation, the present invention uses a protocol (web services application protocol, or WSAP which can be used for communicating with web services (e.g., that model files, devices, services, and people), and includes WSAP verbs that result in services performing operations such as Lookup, Create, Query, Insert, Update, Delete, Get, Notify, Replicate, CancelReplicate, Subscribe, Unsubscribe and Drop operations.

A visualizer service renders to the display to provide a real-time, three-dimensional visualization/debugging tool that shows other services and message communications between those services. To this end, the visualizer service subscribes to a directory agent service for notifications, which includes enumerating the directory agent service to find out which services show up locally, and receiving notifications whenever a new service is added or removed. The visualizer service also inserts itself into the directory service. The visualizer can also discover new services by examining the data packets exchanged between services already being monitored. When visualizing a service that received a message from a port (e.g., URI) never before seen, a Lookup request is sent to the URI requesting its contract. In this manner, the three-dimensional space may begin populating itself with new visual instances of services that the visualizer service did not even know that it was communicating with.

For each notify message received from the directory agent service, the visualizer service determines via maintained contracts data as to whether the visualizer service has never seen a service for this particular notify message. If not, the visualizer service creates (e.g., via a constructor service) a visual collection service and passes the directory agent service's notification to the visual collection service.

The visual collection service creates a visible volume enclosed by a transparent mesh to represent the "code"/type and then subscribes to the directory agent service for services of this contract type, so that the visual collection service independently knows when this particular type of service is inserted or deleted from the directory. The visual collection service also creates (e.g., via a constructor service) a port visual service for each instance in the directory of a service URI of this type.

The port visual comprises a particle system that renders images (e.g., small electron-like spherical balls) that represent each schema-defined type that is mentioned on the contract for this service port, wherein services contain ports/URIs for separate behaviors according to their contract; each such port is represented as a ball, with translucent cubes used as the visual images that contain the service instances of the particular contract. Each visual collection service handles the calculations and spatial placements of particle clusters for the visualizer service, and also maintains a list of services that it manages.

The visualizer service thus depicts the current set of web services running on a local machine as translucent cubes containing a collection of colored particles that orbit in small locations in three-dimensional space, with message passing between services being represented as smaller particles (e.g., dots) that travel on a line between communicating services. The locations may be computed by a hash function, and appear to a viewer relative to a current perspective, which the user may navigate (scroll, pan, zoom and the like by re-computing the current locations). A textured background may be used to help visualize the three-dimensional view, in which one service is typically focused. To maintain the real-time visualization, the visualizer service regularly sends out a WSAP update message to child visual collection services, with the message body containing message movement data. When the visual collection services receive their corresponding message, they forward the message to their respective child port visuals. The message contains the time elapsed since the last frame, allowing the port visuals to perform updates concurrently between the children, including calculating the new positions of messages for rendering as small dot particles.

When visualizing messages, the port visual service 214, when it was created, issued a Create WSAP request for a port monitor service to the constructor/loader service co-located with the real service it wants to monitor. For example, the port visual for the directory service 204 creates a port monitor service to watch the real directory service. The port visual then subscribes to this private port monitor, whereby when any message is received at the local service (typically at its local forwarder), the port visual is notified.

To determine where in visual space the source/sender of this soap message is, the port visual creates a WSAP Notify message and sends it to the visualizer service 202, which also acts as a DNS to visual three-dimensional space resolver by looking at a resolve cache that has a mapping of real service port (URIs) to directory records. In this manner, the create particle data arrives at the visual representation of the source service and gets added to the particle system; it is the responsibility of the source visual to render a message.

Other aspects of the present invention facilitate interaction with the ports and/or messages, such as for purposes of debugging. For example, a message can be dragged and dropped into a debugging environment, where its actual contents may be viewed. Another aspect of the present invention involves propagation, which results in a federated, concurrent search of the particle with the best result forwarded upstream to the requester that asked the question. Further, because the method and system of the present invention are constructed as a set of composed services to represent the visual activities on the screen, the real execution of distributed video rendering surface is provided, where not only can the display run across machines, but the rendering of the video can take place on a different machine from the display target.

Other advantages will become apparent from the following detailed description when taken in conjunction with the drawings, in which:

DETAILED DESCRIPTION

Exemplary Operating Environment

Figure 1:
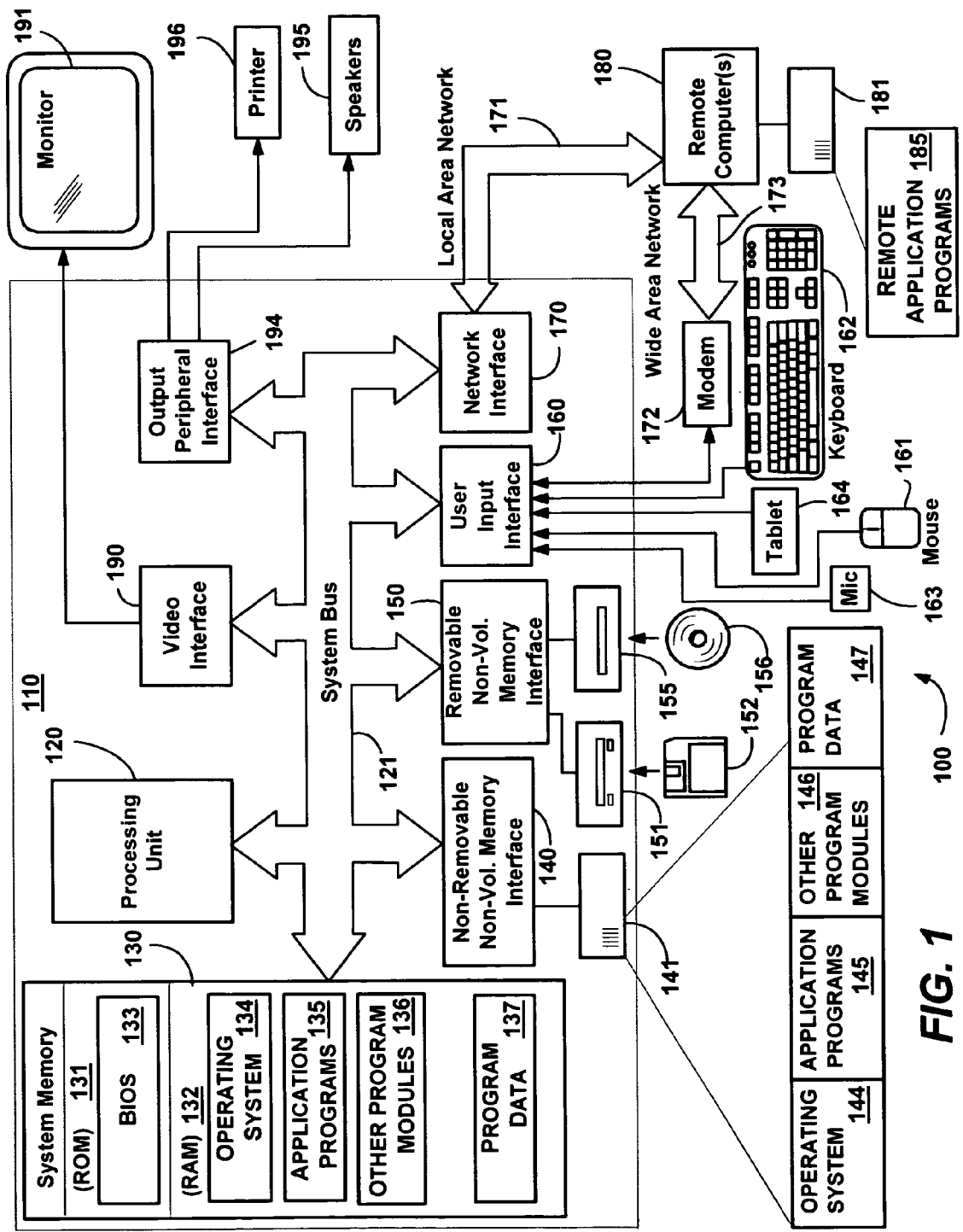
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Web Service Visualizer and Display Surface

In a distributed programming model, a basic programming primitive is a lightweight port, comprising an unordered collection of messages that can be used to store state and effect communication. As described in the aforementioned U.S. patent application Ser. No. 10/856,399, using strictly port communication, service code can implement critical sections and complicated I/O protocols and produce a very concurrent processing model. The present invention relies on such port communication, in one implementation using a protocol (web services application protocol, or WSAP) described therein for communicating with web services. WSAP verbs that result in services performing operations include Lookup, Create, Query, Insert, Update, Delete, Get, Notify, Replicate, CancelReplicate, Subscribe, Unsubscribe and Drop requests. As will be understood, however, the present invention is not limited to any particular protocol, and the general web service model is not limited to a server running software for a client, but applies to any resource that a client wants to access, e.g., the uniform service model supported by WSAP can be used to model files, devices, services, and people.

Figure 2:
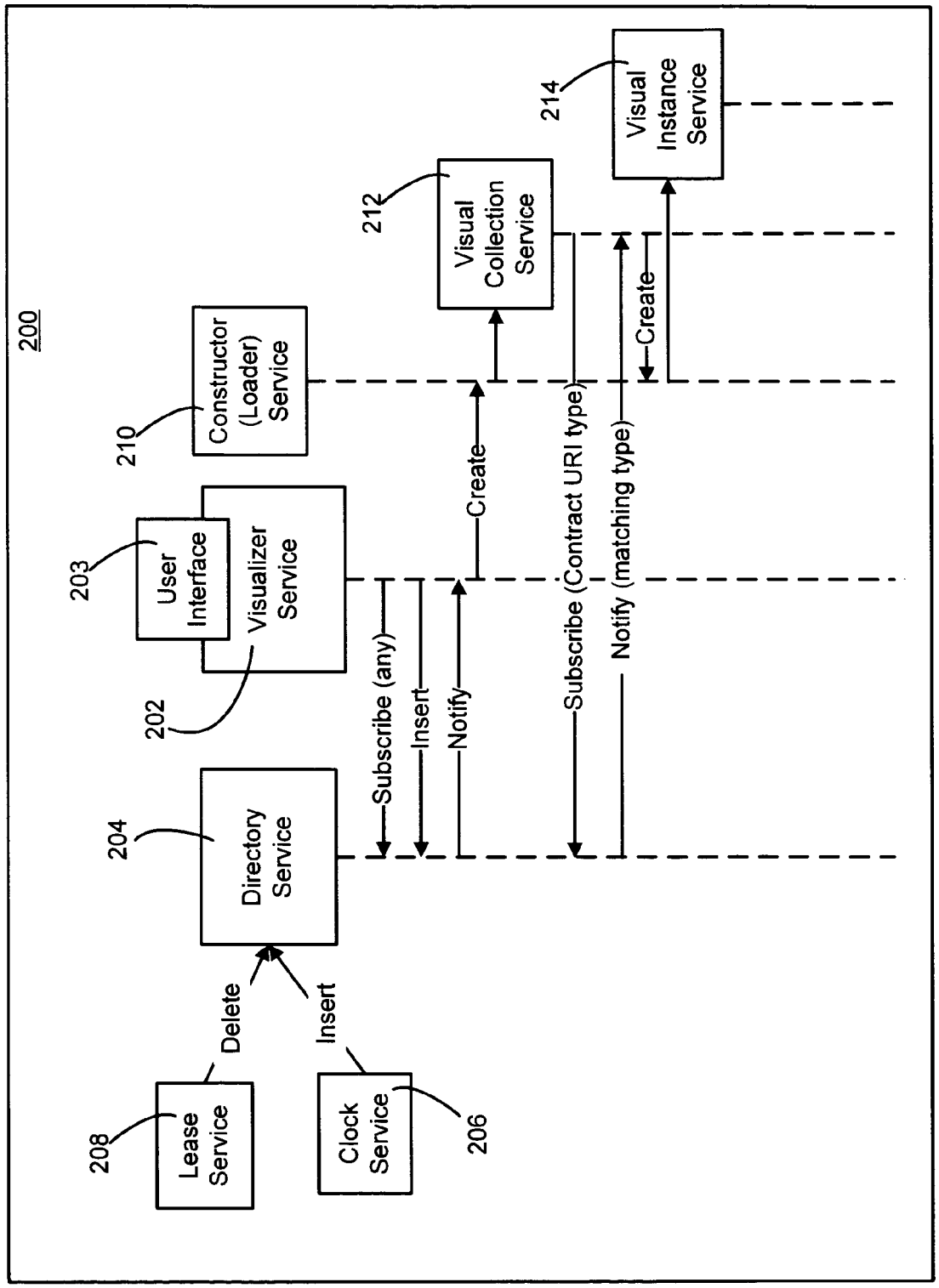
FIG. 2 is a block diagram generally representing services communicating with one another to provide visualization of various services, in accordance with an aspect of the present invention.

FIG. 2 represents an architecture 200 comprising a visualizer service 202 (e.g., which may be the computer system 110 of FIG. 1) communicating with a directory agent service 204, such as via WSAP messages communicated within a SOAP (simple object access protocol) envelope. In general and as described below, the visualizer service 202 is responsible for rendering to the display (e.g., window) surface and drawing the background. In one implementation, the visualizer service 202 comprises a real-time three-dimensional visualization/debugging tool based on Microsoft Corporation's DirectX technology, version 9.

The directory agent service 204 is like any other service, and can be subscribed to for notifications as well as enumerated to find out what it contains. On startup, the visualizer service 202 (e.g., which may be the computer system 110 of FIG. 1) subscribes to the local directory agent service 204, whereby the visualizer service 202 receives notifications on any service that shows up locally. To this end, as represented in FIG. 2, the visualizer service 202 sends a "SubscribeAny"-type command to the directory agent service 204, which then sends notify messages for any service that it knows about, and a message whenever a new service is added (e.g., via a WSAP insert message) or removed (e.g., via a WSAP delete message). For example, a clock service 206 may add itself to the directory service 204 via an Insert message, or a lease service 208 (that expires unresponsive services) may delete a service from the directory. Note that for simplicity, only one such notification is shown in FIG. 2, but from FIG. 3 it is apparent that any practical number is possible. The visualizer service 202 also inserts itself into the directory service via an Insert message.

For each notify message received from the directory agent service 204, the visualizer service 202 looks at a table or the like that maintains contracts, wherein in general, a contract comprises a URI or the like to data that describes a web service's requirements. If the visualizer service 202 has never (e.g., since startup) seen a service URI of this contract for this particular notify message, the visualizer service 202 communicates with a constructor 210 (a loader class) to create a visual collection service 212. When informed that the creation was successful, the passes the directory agent service's notification to the visual collection service 212.

As described below, the visual collection service 212 creates a volume enclosed by a transparent mesh to represent the "code"/type and then subscribes to the directory agent service 204, but only for services of this contract type. This allows the visual collection service 212 to independently know when this particular type of service is inserted or deleted from the directory. Via the constructor 210 the visual collection service 212 also creates a port visual service 214 for each instance in the directory of a service URI of this type. Again, only one is shown in FIG. 2, however FIG. 3 indicates that any practical number is feasible.

Note that the visualizer relies on existing and core services, and mechanisms to enumerate, capture and visualize service instances and messages. Further, the visualizer relies on an observable, message based system, whereby the service instances and messages are visualized in a loosely coupled manner that does not have a negative performance impact on the real services being visualized. The visualizer service, because it is a service itself, does not even have to be co-located with the services being visualized.

Figure 4:
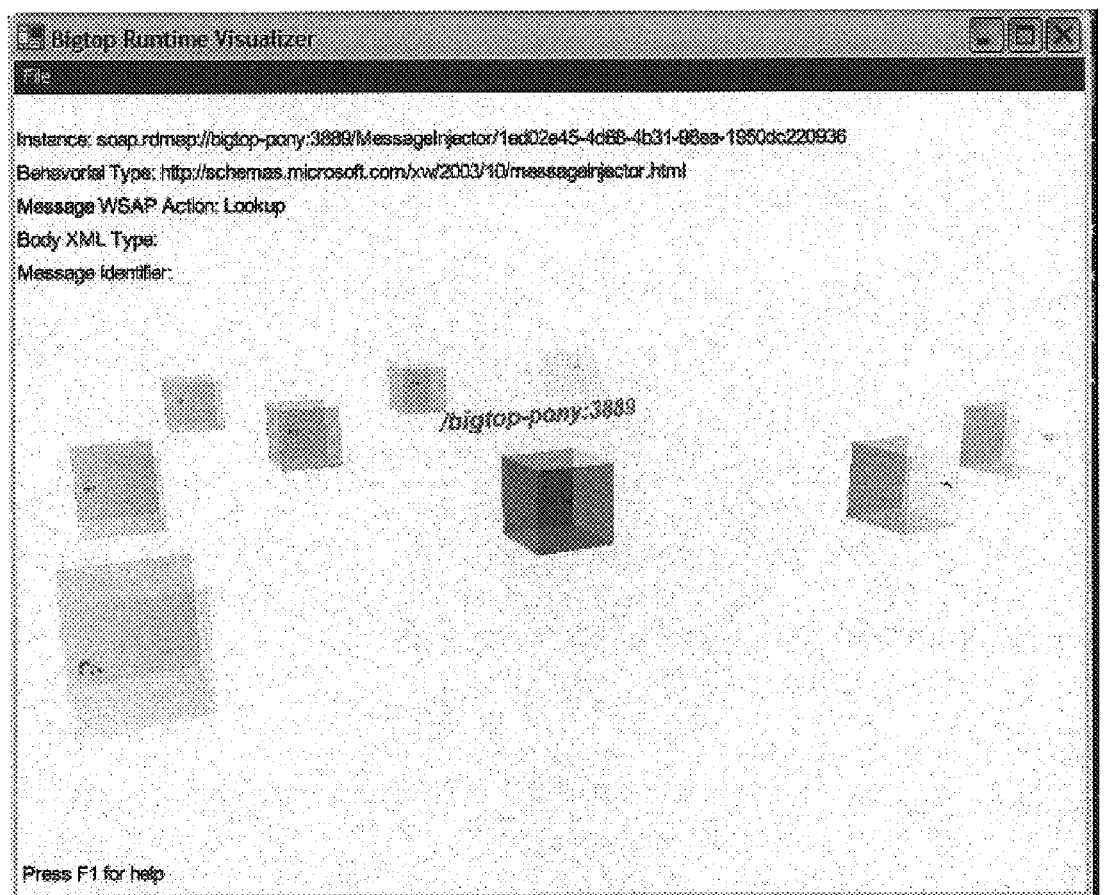
FIGS. 4-6 are example screenshots generally representing how the internals of an operating system may be visualized, in accordance with an aspect of the present invention.

The port visual 214 comprises a particle system that renders images (e.g., small electron-like spherical balls) that represent each schema-defined type that is mentioned on the contract for this service port. In other words, as described in the aforementioned U.S. patent application Ser. No. 10/856, 399, services contain ports/URIs for separate behaviors according to their contract; each such port is represented as a ball, and if as typical a service has multiple ports, the balls are shown as being generally clustered together. FIG. 4 shows the enumerated services in which the contract visual collections are represented by translucent cubes that contain the service instances of the particular contract. Note that in this implementation, what are being visualized are service URIs/ports, not services, although at a zoomed-out distance the services and ports may tend to appear as an object. It is each visual collection service 212 that handles the calculations and spatial placements of particle clusters for the visualizer service 202. The visual collection service 212 also maintains a list of services that it manages.

Figure 3:
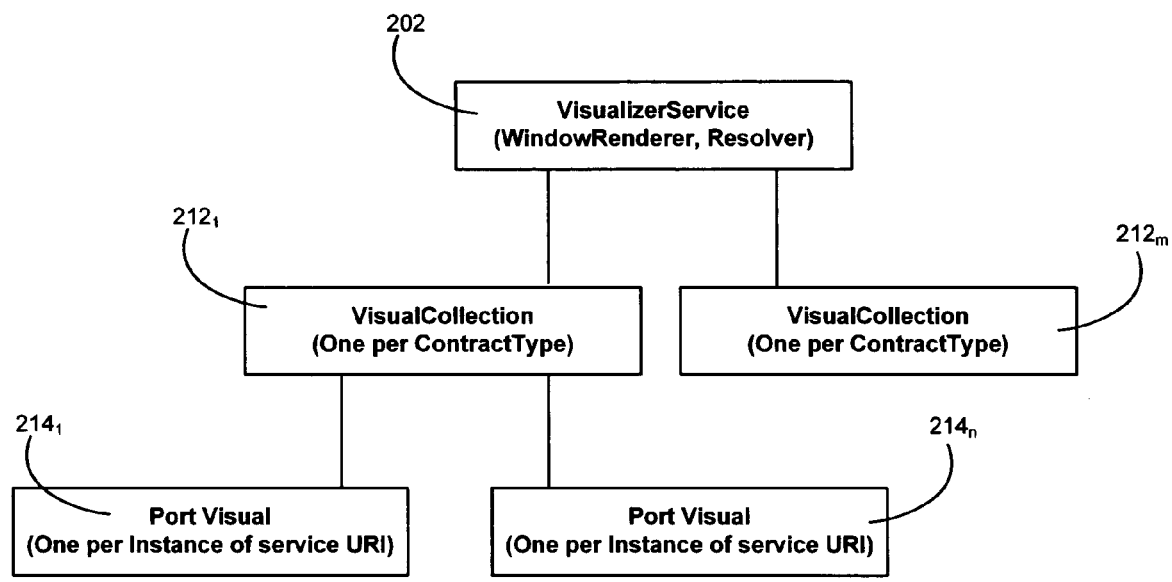
FIG. 3 is a representation of a service hierarchy to provide visualization of various services, in accordance with an aspect of the present invention.
Figure 5:
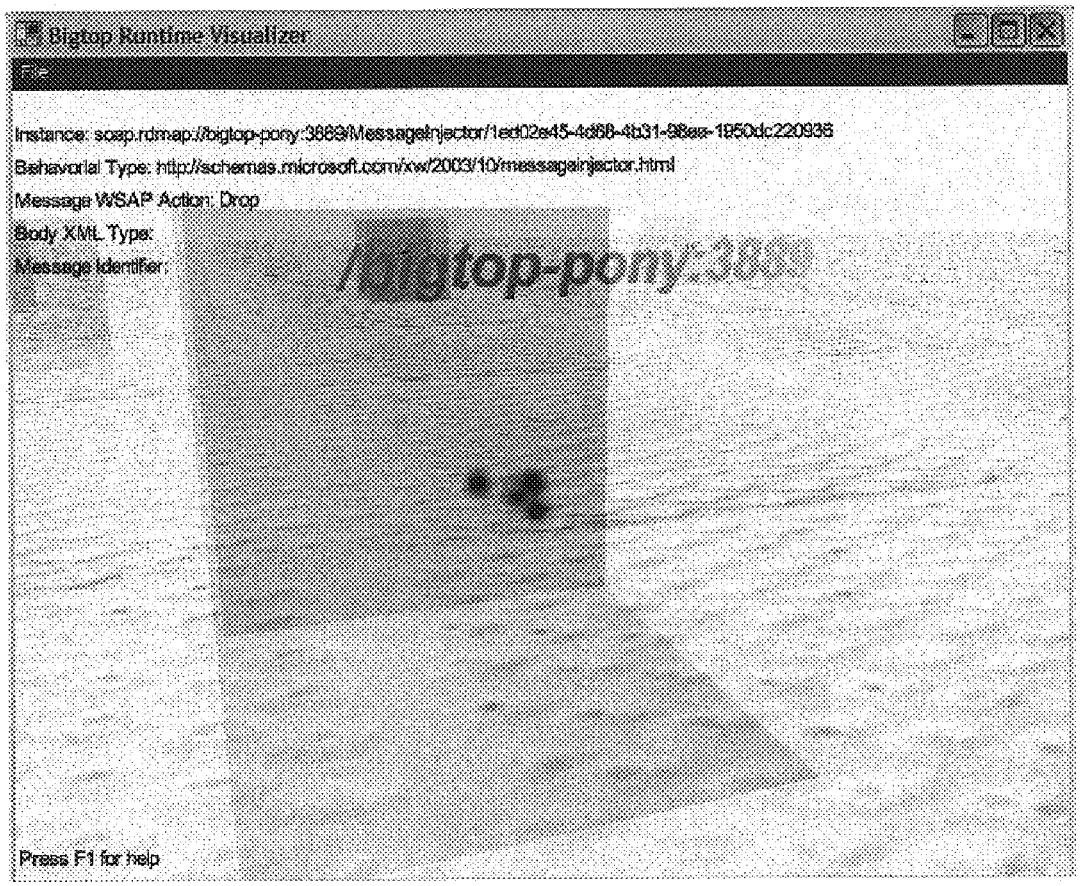

As represented in the hierarchy of FIG. 3, the visualizer service 202 talks to its immediate children, the visual collection services $212_1$-$212_m$. The visual collection services are displayed in one implementation, generally shown in FIGS. 4 and 5, as generally large object (e.g., composed of port clusters) that represent the code/contract. Note that as shown in FIG. 4, a cube surrounding such a collection of service ports may be colored and/or shaded differently, and have an associated name, to indicate which service has focus. When the focused cube encapsulates a service object (e.g., of port particles), that service has the focus, and its type data may be displayed on the screen as text, as in FIG. 4. When the focus changes to another service, the visualizer service application 202 centers that newly-focused service in its window. If a service replicates, it remains in close proximity to the original instance of the service. A user interface 203 of the visualizer program provides zooming (as shown in FIG. 5, which also indicates a different message) and panning; rotating left or right; and raising or lowering the perspective.

Figure 6:
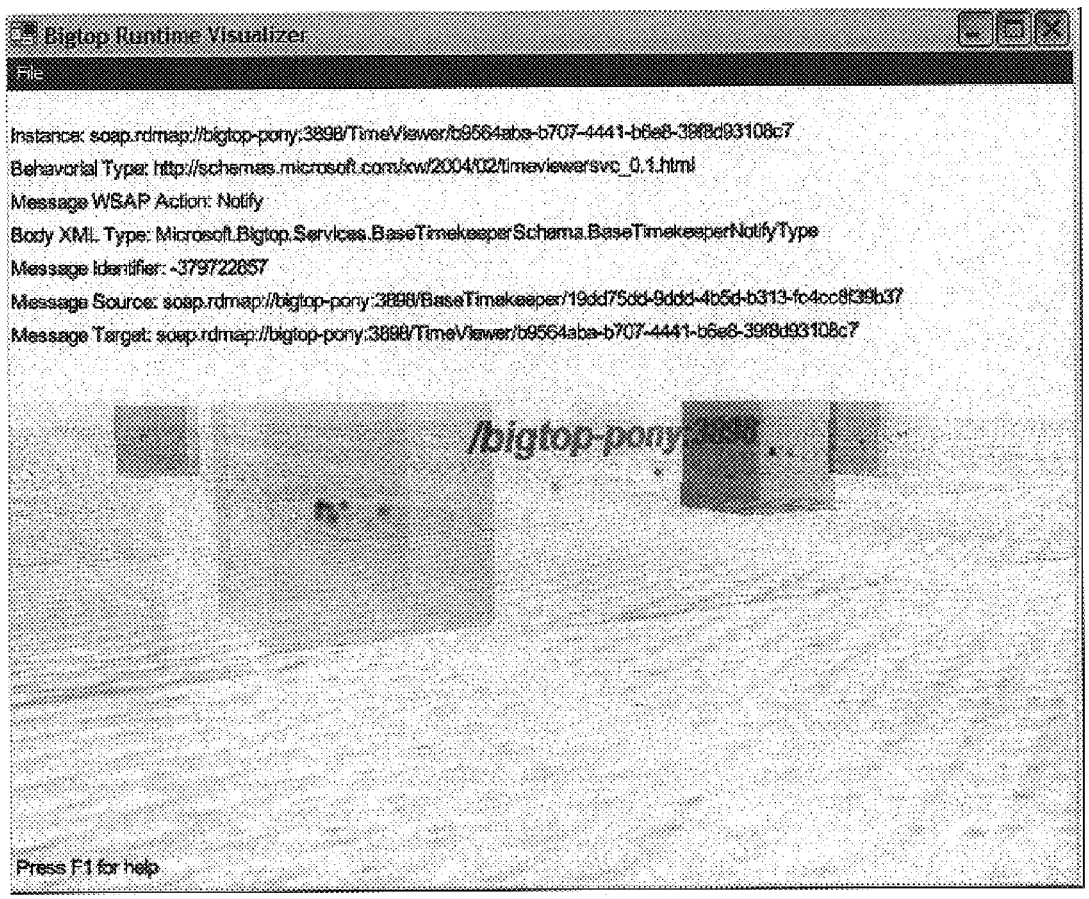

As shown in FIG. 6, the visualizer service 202 depicts the current set of web services running on a local machine as a collection of colored particles that orbit in small locations in three-dimensional space, with message passing between services being represented as smaller particles (e.g., dots) that travel on a line between communicating services. In FIG. 6, these message particles are visible between the cubes surrounding the services ball-shaped port representations. A textured background may be used to help visualize the three-dimensional view. Although not readily apparent in FIGS. 4-6, the balls representing the services' ports and/or the surrounding cubes may change in brightness when services are involved in a message exchange. If so, the lighting level returns to normal when the message exchange completes.

To maintain the real-time visualization, at some interval, such as every frame, the visualizer service 202 sends out a WSAP update message, with the message body containing msgFrameMove data. This message is sent (e.g., in parallel) to the visual collection services $212_1$-$212_m$. This is a message-based rendering technique required for loosely coupled set of WSAP services, such as the visualizer and the visual collection and visual instance services. Because the visualizer service can not know all the child visual services, the FrameUpdate and Render messages are propagated in a viral, outward fashion.

When the visual collection services $212_1$-$212_m$ receive their corresponding message, they in turn forward the message (e.g., in parallel) to their children, namely the port visuals $214_1$-$214_n$, which are visual instances of service URIs. The message contains the time elapsed since the last frame, allowing the port visuals to perform updates concurrently between the children ("leaf" nodes), including calculating the new positions of messages, which as described above are represented as small particles.

A second message that the visualizer service 202 sends, e.g., per frame, is a WSAP Update message with a body containing msgRender. In one implementation, this message has strict requirements, namely that only one particle system, anywhere in the hierarchy, can render to the target "port" (comprising the hardware input stream) at any time. To this end, the top level service sends it to its children, in order, waiting for a response (e.g., a WSAP UpdateRsp), before sending the message to its next immediate child. The child does the same for its children, essentially creating a depth-first sequential traversal of an arbitrary length tree. Note that the top service does not know the depth number of all children, but it does not matter. Other alternative implementations provide more concurrent rendering.

When visualizing messages, the port visual service 214, when it was created, asked a local port monitor seed service to create a new port monitor instance bound to the real service it wants to monitor. For example, the port visual for the directory service 204 creates a port monitor service to watch the real directory service. The port visual then subscribes to this private port monitor, whereby when any message is received at the local service (typically at its local forwarder), the port visual is notified.

To determine where in visual space the source/sender of this soap message is, the port visual creates a WSAP Notify message and puts the message inside a msgCreateParticle with the port monitor record describing the message, and sends it to the visualizer service 202. The visualizer service 202, which acts as a DNS to visual three-dimensional space resolver, looks at a resolve cache that has a mapping of real service port URIs to directory records. This allows it, without doing a lookup, to find the visual collection that should have the port visual for this source real service. In this manner, the msgCreateParticle arrives at the visual representation of the source service and gets added to the particle system; note that it is the responsibility of the source visual to render a message.

Note that with respect to message delivery, the visualizer service has the ability to essentially "freeze" message particles, such as when the real service being monitored received no response message for a request. As a result, a developer/debugger can easily see what messages have not been delivered, since they are proximate (e.g., appear to be "levitating") around the target service that failed to send the response.

Further, the visualizer's dynamic abilities with respect to the visual representation of service instances allows users to observe the transformation of a process (a web service) as it evolves through interaction with other services. For example, when a service starts, the visualizer will display the messages it is receptive to, at its initial state, as little electron balls or the like available for interaction. When another service sends a message, the receiving service changes state; for example, the receiving service progresses to a different state where it is possibly receptive to a different set of WSAP messages. By way of example, a service may be listening for a corresponding response (InsertRsp) to an Insert, and will accept nothing else until the response is received. The visualizer, by reading the contract document that it received from the lookup for the displayed service, can determine what state the service is in, and accordingly remove or add little spheres for the now available message types the service is expecting.

This is a real time, visual transformation of a web service, to make clear what interaction points are available as each service moves from state to state. This allows a developer to easily see the "state" a given service is in.

In addition to displaying representations of the internal ports and messages of a distributed operating system, the present invention facilitates interaction with the ports and/or messages, such as for purposes of debugging. For example, a message can be dragged and dropped into a debugging environment, where its actual contents may be viewed.

Another aspect of the present invention involves propagation via a msgCalculateDotProduct; when requesting the INSTANCE/TYPE of any particle on the screen, which results in a federated, concurrent search of the particle with the best result (the particle in the virtual rays path), and at each node in the hierarchy, on the way up, elects a single best answer and forwards upwards. On the way back a local election is done at each section, before forwarding a result upstream to the requestor that asked the question.

Note that because the method and system of the present invention are constructed entirely as a set of composed services to represent the visual activities on the screen. As a consequence, the real execution of distributed video rendering surface is provided, where not only can the display run across machines, but the rendering of the video can take place on a different machine than the display target.

Service Information

The WSAP message names used by the various services and their behaviors described below are further documented in the aforementioned U.S. patent application Ser. No. 10/856,399.

The Visualizer Service

As described above, the visualizer service provides a three-dimensional representation of services that are loaded and interacting through the distributed operating system. The services can be on one or multiple nodes (machines).

The visual collection service subscribes for Insert and Delete notification on the directory; however notifications are not received for Drops. Instead, when a service instance goes away, the service instance, or some other agent, will send a Delete to the directory for the instance being removed. The visual collection service gets notified, and in response sends a Drop to the visual instance service responsible for the service instance being deleted from the directory For enumeration, the visual collection service receives an Insert from the directory, and will then issue a Create request to the constructor for a new visual instance service. Note that the visualizer can discover new services through the directory, but can also discover new services in at least one other way.

More particularly, the visualizer can also discover new services by examining the Source and Destination URIs in the routing headers in the SOAP packets exchanged between services already being monitored. Although the three-dimensional space is populated with only the services that the initial set of services communicated with, it is viral in nature in that when currently visualizing a service that received a message from a URI never before seen, a Lookup is sent to the URI requesting its contract. If the Lookup request succeeds, an Insert is sent to the parent visualizer service which then makes a decision based on the contract that the visual collection service sent to forward the Insert. This makes the process appears as if the Insert came from a directory, even though in actuality it was built, in a distributed, loosely-coupled manner, by some other visual collection.

As a result, the three-dimensional space begins populating itself with new visual instances of services that the visualizer service did not even know that it was communicating with. When a service is running on a remote node, the visualizer service creates a top level visual collection representing that node, with its own independent set of visual collections and so forth. This is loosely coupled, dynamically building a three-dimensional representation of the ecosystem of services that the application or local node rely on.

Figure 7:
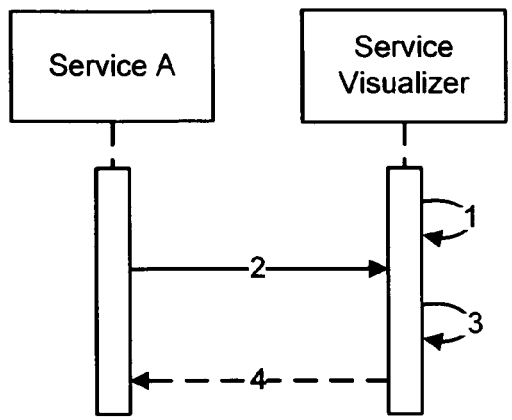
FIGS. 7-11 are timing diagrams representative of how various services perform operations to provide visualization in accordance with various aspects of the present invention.

Once the service is up and running, the timing sequence for most messages is straightforward, as represented in FIG. 7 in which the labeled arrows represent the following operations:
1. The service visualizer listens for a message
2. A service sends a message to the service visualizer.
3. If supported, a simple service acts on the message.
4. If the message type warrants, the simple Service builds and sends a response message.
5. (Query message only) If the query requests a service not in the service table, the service visualizer creates an entry by sending itself an Insert request message.

Figure 8:
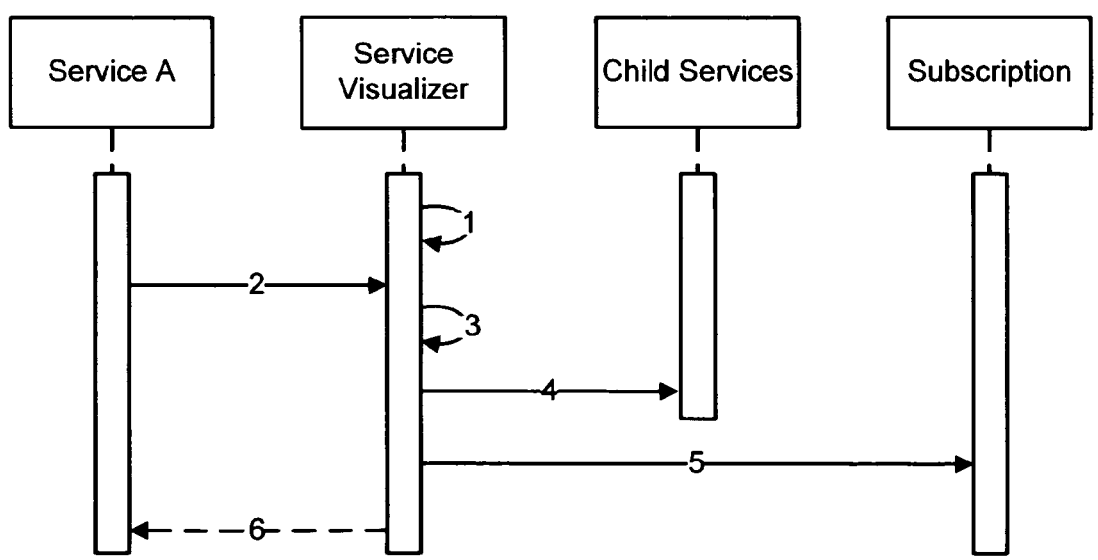

For the Drop message, a different timing sequence occurs, as represented in FIG. 8:
1. The service visualizer listens for a message
2. A service sends a Drop message to the service visualizer.
3. The service visualizer removes its entry from the directory and disables the Notify handler.
4. The service visualizer sends Drop messages to the services listed in its service table.
5. If the service visualizer has any subscriptions, it sends Unsubscribe messages to the appropriate services.
6. The service visualizer disposes itself and sends a response to the requesting service.

A Drop Request message terminates the service. The sequence of events in this process includes sending a DirectoryDelete message to be sent to the DirectoryAgent service, disabling the Notify receiver, sending Drop messages to the services listed in the service table, Unsubscribing (e.g., probably from the timekeeper) and disposing of self. The request message uses the WSAP drop message form. This service uses Common.DropDeleteAndDispose to clear the directory list and terminate the service.

A Get Request message sends the service table to the requesting service. The request message used the standard form. The response message, ServiceVisualizerGetResponseType, contains the list of services as an array of DirectoryRecordListType entries. An Insert Request message creates an entry in the service table for the requesting service. The request message body uses ServiceVisualizerInsertRequestType format. The service issues the default Insert Response message.

A Lookup Request message, (in which the request and corresponding result message use the standard WSAP format), looks up data; the response message contains a reference to the messaging protocol used by the response, the contract name of the service receiving the request and the instance of the service that responded to the request. A Notify Message forwards notification messages onto the Notify port.

A Query Request message returns the sought-after service information or sends a fault to the client and inserts the service in its table. The request message conforms to the WSAP Query Request message requirements. The service uses individualized forms for the request and response messages, e.g., a schema may define the query message protocols, ServiceVisualizerQueryRequestType and ServiceVisualizerQueryResponseType. The Query Response message contains service information in the ServiceVisualizerRecordtype form.

An Update Request message retrieves the message, stripping off the SOAP and WSAP headers, then reposts the message through the WsapForwarder.

The Visual Collection Service

As described above, the visual collection service handles the calculations and spatial placements of particle clusters for the visualizer service. The visual collection service also maintains a list of services that it manages.

Timing sequences for the visual collection service may vary among WSAP messages. For example, the timing sequence of a WSAP Lookup message comprises a request and corresponding response between the requesting service and the visual collection service. The timing sequence for each of the WSAP Update and Query messages comprise a single message request. No response message is given; however, the display is updated according to the content of the request.

Figure 9:
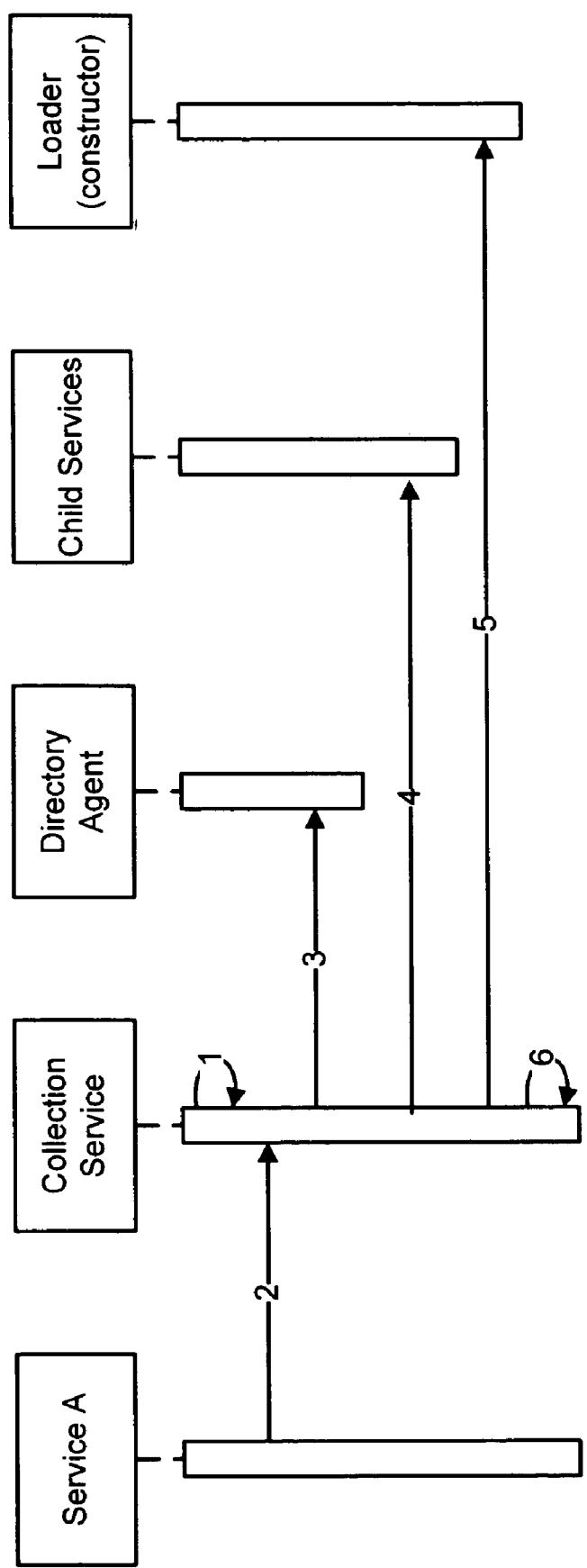

Timing for a WSAP Drop message is as follows, as represented in FIG. 9 wherein the labeled arrows correspond to the following operations:
1. The visual collection service listens for a message.
2. A service sends a Drop message to the visual collection service.
3. The visual collection service unsubscribes from the Directory agent service (the local directory service).
4. The visual collection service sends Drop requests to its children services (the visual instances).
5. The visual collection service sends a DropDeleteAndDispose message to the Loader.

Figure 10:
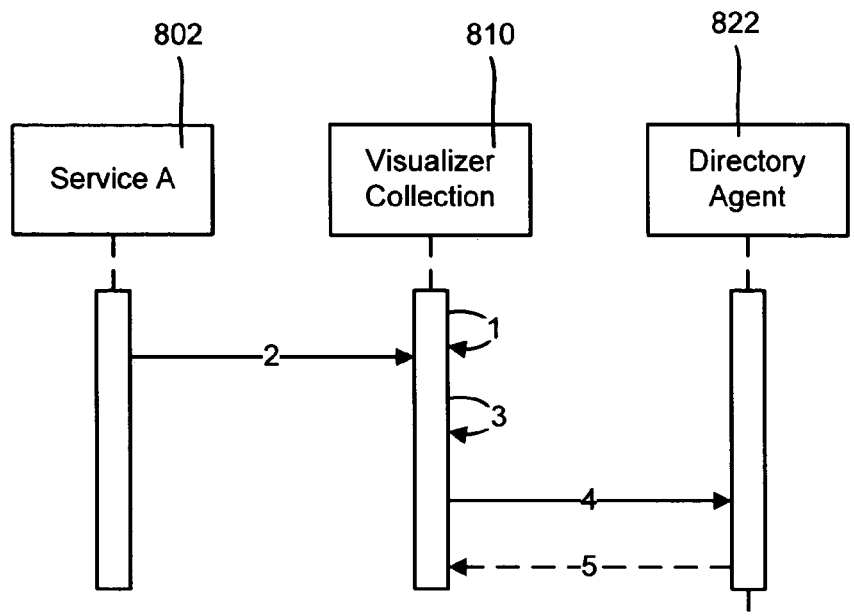

Timing for the WSAP Notify Drop message is as follows, as represented in FIG. 10 wherein the labeled arrows correspond to the following operations:
1. The visual collection service listens for a message
2. A service sends a Notify message to the visual collection service.
3. The visual collection service sends a Lookup request to the Directory Agent service, (the local directory service).
4. The visual collection service receives the corresponding response from DirectoryAgent and acts accordingly. If this is a new entry sends Drop requests to its children services
5. The visual collection service sends a DropDeleteAndDispose message to the Loader.

Messages supported by the visual collection service include a drop request message, which terminates the service. When received, the visual collection service unsubscribes from the Directory Agent, sends Drop messages to the services in the collection, and disposes of itself. The request message uses the WSAP drop message form; the service uses Common.DirectoryDelete to clear the directory list and Common.Dispose to terminate the service.

A Lookup request message and corresponding result message uses the standard WSAP format. The response message contains a reference to the messaging protocol used by the response, the contract name of the service receiving the request, and the instance of the service that responded to the request.

A Notify message uses the standard WSAP format, and moves incoming notification messages to a Notify port, where the appropriate handlers receive and process the messages. The Notify port handles message types including DirectoryInsertRecordRequest, DirectoryInsertRecordRequest, and PortMonitorInsertRequest.

The Query request message conforms to the WSAP Query message requirements and results in the service issuing the default WSAP Query Response message. The request moves incoming query messages to a Graphics port, where the appropriate handlers receive and process the messages. Handlers at the Graphics port use the contents of the Query request calculate update information and render the window display.

The Update request message, which likewise conforms to the WSAP Update message requirements, moves incoming update messages to the Graphics port, where the appropriate handlers receive and process the messages. Handlers at the Graphics port use the contents of the Query request to calculate update information and render the window display. The service issues the default Update response message.

Response messages include a DirectorySubscribeResponseType Message, which caches, on the main port, the subscription response sent from the DirectoryAgent service. The visual collection service sends a subscription request to the DirectoryAgent for each service added to its collection. The response message body is based on a schema-defined DirectorySubscribeResponseType message. A LookupResponseType message receives information about a service that is not in its collection. The visual collection service adds the service to the collection and creates a visual entry (a particle) in the window. If the visual collection service receives a request to add a service to its collection and the service is not already listed, the visual collection service issues a lookup message to the service being added. The Lookup response contains information missing from the original Insert request.

SOAP Messages bound to the Notify Port include a DirectoryInsertRecordRequestType message; if the requested service is not listed among the known services, this message creates a new particle for the visualizer service. Otherwise, the visual collection service sends an Insert message to the node handling the specified contract type. The request message body is based on DirectoryInsertRecordRequestType. This message does not issue a response message. The PortMonitorInsertRequestType message makes a light appear to shine on the service "particle" represented in the service visualizer, and sends a notification message to the requester.

The Port Monitor Service

As also described above, the port monitor service monitors SOAP WSAP messages received at a bound service port. The port monitor service binds to the forwarder of the specified service, and notifies its subscriber whenever a soap message is received.

Figure 11:
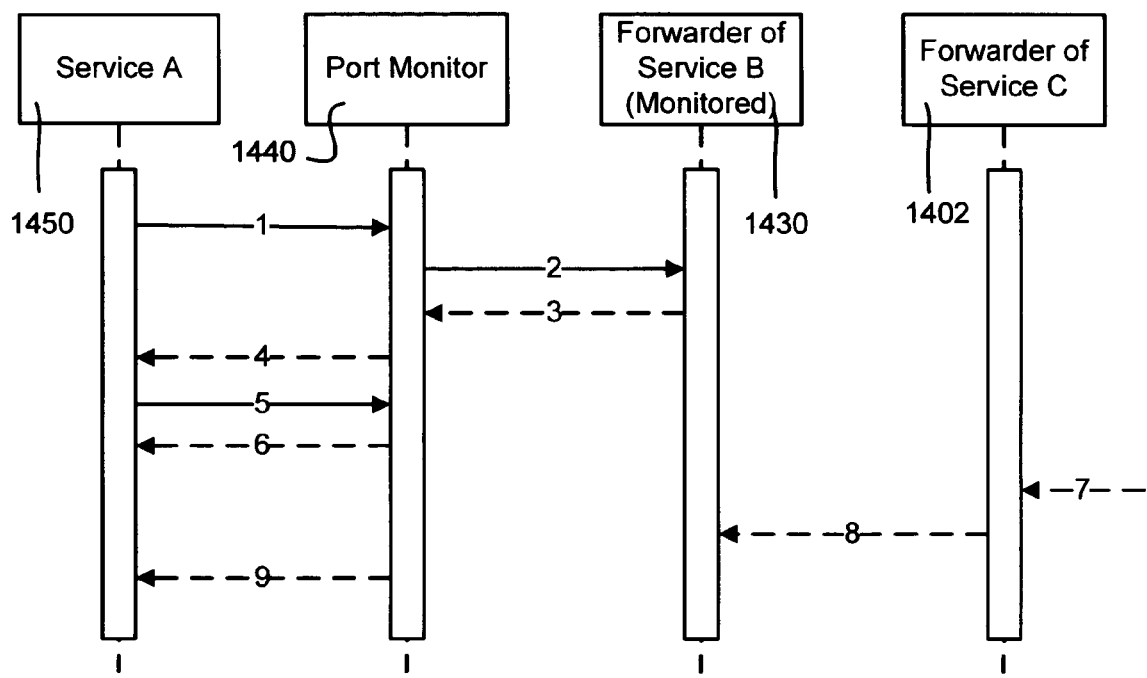

With respect to timing, the port monitor is created by the service requesting monitoring. The timing sequence, which occurs in setting up and running the service, is represented in FIG. 11, wherein the labeled arrows correspond to the following operations:

1. A service (Service A) wants to monitor Service B and creates a port monitor service to do so.
2. The port monitor sends an AttachMonitor request to the port forwarder.
3. The port forwarder sends a response message when the binding completes.
4. The port monitor sends a CreateResponse message to Service A.
5. Service A sends a WSAP subscribe message to the port monitor.
6. The port monitor returns a WSAP subscribe response to Service A.
7. Another service (Service C) sends a message to the monitored service.
8. The monitored forwarder of Service B receives the message.
9. The port monitor detects the message and sends notify messages to its subscribers.

Messages include PortMonitorInsertRequestType, a non-WSAP message which adds the insert request to the port monitor log file, then notifies subscribers. A WSAP Drop Response message detaches the monitor from the target service, then terminates the service. The request message and response messages use the default WSAP drop message forms. This service uses Common.DropDeleteAndDispose to terminate the service.

A Get Request message in the standard WSAP form requests the entire log table. The Get Response message contains a copy of the log table as an array list. A Lookup Request message, and its corresponding result message use the standard WSAP format; the response message contains a reference to the messaging protocol used by the response, the contract name of the service receiving the request and the instance of the service that responded to the request. Notify messages are sent to subscribing services notices of updates to the PortMonitor log table. Notification messages package data according to PortMonitorInsertRequestType.

A Subscribe Request message adds the requesting service to the subscriber list. Subscribers receive notification when changes occur in the log table and when new subscribers enlist for notifications. The request message packages data according to PortMonitorSubscribeRequestType. The response message packages data according to PortMonitorSubscribeResponseType. An Unsubscribe Request message adds the requesting service to the subscriber list. The request message packages data according to PortMonitorUnSubscribeRequestType. Unsubscribe does not issue a response message.

The Visual Instance Service

As described above, each visual instance service handles the calculations and spatial placement of a single particle for the visualizer service. Once the service is up and running, the timing sequence is straightforward:

1. A service sends a message to the Visual Instance Service.
2. The Visual Instance Service listens for a message
3. The Visual Instance screens the incoming message
4. If supported, the Visual Instance Service acts on the message.
5. If the message type warrants, the Visual Instance Service builds a response message.
6. The Visual Instance Service sends the response, again as warranted.

A Delete Request message removes the specified service to a list of monitored services. The request message body is based on LivenessMonitorDeleteRequestType. The response message uses the DefaultDeleteResponseMessageType. A Drop Request message, which uses the WSAP drop message form, terminates the service. This service uses Common.DirectoryDelete to clear the directory list and Common.Dispose to terminate the service.

A Get Request message, which uses the standard WSAP Get message form, requests the entire list of service types. The Get Response message contains a copy of the service table as an array of TypeDirectoryRecordType entries. An Insert Request message, which conforms to the WSAP Insert message requirements, requests an addition to the list of service types. The service issues the default Insert Response message.

A Lookup Request message as well as its response are in the standard WSAP message format. The response message contains a reference to the messaging protocol used by the response, the contract name of the service receiving the request and the instance of the service that responded to the request.

A query Request message requests services matching a specific contract name. The request message conforms to the WSAP Query Request message requirements; the service issues a default Insert Response message. The Query Response message contains a list of matching service table entries an array of TypeDirectoryRecordType entries.

CONCLUSION

As can be seen from the foregoing detailed description, there is provided a method and system that provides a new way to view, in real-time, the internals of a distributed operating system as those internals execute. The relative efficiency of protocol interactions is thus visually understood, and the ability to view selected subsets of the operating execution on a protocol basis is provided. Interactions with a distributed debugging environment provide a powerful tool. Moreover, because the method and system are constructed as a set of composed services represent the visual activities on the screen, execution of distributed video rendering surface is provided, in which the display can run across machines and the rendering of the video can take place on a different machine than the display target. The method and system thus provide significant advantages and benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. At a computing system in a computing environment, a method for visualizing services, the method comprising:
   obtaining information about a plurality of services registered with a directory service, the obtained information including for each registered service: a Uniform Resource Identifier to a contract that describes the service's requirements, the requirements including separate behaviors corresponding to each of a plurality of ports indicated in the contract, each port configured to transfer messages of a specified schema-defined message type;
   generating a visualization to represent the interaction between the plurality of registered services based on the described requirements in the contract for each registered service, the visualization including generating:
   for each registered service:
      a service graphical object representing the registered service; and
      a clustered plurality of port graphical objects, each of the clustered plurality of graphical port objects visually depicted within the service graphical object to indicate that each port graphical object in the clustered plurality of graphical port objects corresponds to the registered service, each of the clustered plurality of port graphical objects visually and individually representing a corresponding port from among the plurality of ports indicated in the registered service's contract, each of the clustered plurality of port graphical objects also corresponding to the specified schema-defined message type of the represented corresponding port; and
      a separate plurality of message graphical objects depicted separate from the clustered pluralities of graphical port objects for each registered service, each of the separate plurality of message graphical objects depicted on a route between a sending port graphical object, from among the plurality of port graphical objects within one graphical service object, and a receiving port graphical object, from among the plurality of port graphical objects within another different graphical service object, each of the separate plurality of message graphical objects representing a schema-defined message being communicated between corresponding ports of the registered services represented by the sending and receiving port graphical objects respectively so as to indicate the behaviors being utilized at the registered services.

2. The method of claim 1 wherein obtaining information about services registered with the directory service comprises subscribing for notifications from the directory service.

3. The method as recited in claim 1 wherein generating the visualization comprises highlighting any port items for corresponding ports that are participating in the communication of a schema-defined message.

4. The method of claim 1 wherein generating a service graphical object representing the registered service comprises generating a translucent cube representing the registered service.

5. The method of claim 4 wherein generating a clustered plurality of port graphical objects within the graphical service object comprises generating a clustered plurality of spheres of a first size within the translucent cube.

6. The method of claim 1 wherein generating the visualization comprises creating a visual collection service to handle calculations and spatial placements for each visible item representative of each service.

7. The method of claim 5 wherein generating a separate plurality of message graphical objects separate from the clustered pluralities of port graphical objects comprises generating a plurality of spheres of a second smaller size, each sphere of the second smaller size representing a message being exchanged between ports represented by spheres of the first size.

8. The method of claim 1 further comprising sending update messages to provide a dynamic real-time visualization of message movement between items representing services.

9. The method of claim 1 further comprising, discovering a new service by examining data in a packet exchanged between services being monitored.

10. The method of claim 1 wherein generating the visualization comprises rendering a background surface that creates an impression of a three-dimensional view.

11. A computer program product including at least one physical storage medium having stored thereon computer-executable instructions, which when executed at a processor, cause the computer system to perform the method of claim 1.

12. In a computing environment having a directory service that provides information about services, a system comprising:
   one or more processors;
   system memory; and
   one or more physical storage media having stored thereon:
   a visualizer service coupled to the directory service, the visualizer service configured to:
      obtain information about a plurality of services known to the computing environment, the obtained information including:
         a Uniform Resource Identifier to a contract that describes the service's requirements, the requirements including separate behaviors corresponding to each of a plurality of ports indicated in the contract, each port configured to transfer messages of a specified schema-defined message type;

a visual collection service—for each of the plurality of services for which the information was obtained, each visual collection service coupled to the directory service by subscribing for insert and delete notifications for services of a contract type;

a port visual service for each instance in the directory of a service contract of each type; and wherein the visualizer service, each visual collection service, and each port visual service pass update-related messages to generate a visualization representing the interaction between the services based on the described requirements in the contract for each service, the visualization including:

for each registered service:

a service graphical object representing the registered service; and a clustered plurality of port graphical objects, each of the clustered plurality of graphical port objects visually depicted within the service graphical object to indicate that each port graphical object corresponds to the registered service, each of the clustered plurality of port graphical objects visually and individually representing a corresponding port from the plurality of ports indicated in the registered service's contract, each of the clustered plurality of port graphical objects corresponding to the specified schema-defined message type of the represented corresponding port; and separate plurality of message graphical objects depicted separate from the clustered pluralities of port graphical objects for each registered services, each of the separate plurality of message graphical objects depicted on a route between a sending port graphical object, from among the plurality of port graphical objects within one graphical service object, and a receiving port graphical object, from among the plurality of port graphical objects within another different graphical service object, each of the separate plurality of message graphical objects representing a schema-defined messages being communicated between corresponding ports of the registered services represented by the sending and receiving port graphical objects so as to indicate the behaviors being utilized at the services.

13. The system of claim 12 further comprising a constructor, wherein the visual collection service is caused to be created by the visualizer service via the constructor.

14. The system of claim 12 further comprising a new port monitor instance created via a port visual and bound to a service being monitored.

15. The system of claim 12 wherein the visualizer service obtains the information about the services by subscribing for notifications from the directory service.

16. The system of claim 12 wherein the visualizer service further discovers new services by examining data in packets exchanged between services being monitored.

17. The system of claim 12 wherein the visualization includes highlighting any port items for corresponding ports that are participating in the communication of a schema-defined message.

18. The system of claim 17 wherein the visualization including a graphical service object representing the registered service comprises the visualization including a translucent cube representing the registered service.

19. The system of claim 18 wherein the visualization including a clustered plurality of graphical port objects within the graphical service object comprises the visualization including a clustered plurality of spheres of a first size within the translucent cube.

20. The system of claim 12 wherein generating the visual collection service performs calculations and spatial placements for each visible item representative of each service.

21. The system of claim 19 wherein the visualization including a separate plurality of graphical message objects separate from the clustered pluralities of port graphical objects comprises the visualization including a plurality of spheres of a second smaller size, each sphere of the second smaller size representing a message being exchanged between ports represented by spheres of the first size.

22. The system of claim 12 wherein the update-related messages are processed to provide a dynamic real-time visualization of message movement between the items representing the services.

23. The system of claim 12 wherein the visualization includes a background surface that creates an impression of a three-dimensional view.

24. A computer-program product for use at a computer system, the computer program product for implementing a method for visually representing a plurality of services, the computer program product comprising one or more physical storage media having stored thereon computer-executable instructions, which when executed at a processor, cause the computer system to perform the method, including the following:

obtain information about services registered with a directory service, the obtained information including for each registered service:

a Uniform Resource Identifier to a contract that describes the service's requirements, the requirements including separate behaviors corresponding to each of a plurality of ports indicated in the contract, each port configured to transfer messages of a specified schema-defined message type;

render a three-dimensional representation of the interactions between registered services based on the described requirements in the contract for each registered service, the three-dimensional representation including:

for each registered service:

a service graphical object representing the registered service; and a clustered plurality of port graphical objects, each of the clustered plurality of graphical port objects visually depicted within the service graphical object to indicate that each graphical port object in the clustered plurality of graphical port objects corresponds to the registered service, each of the clustered plurality of port graphical objects visually and individually representing a corresponding port from the plurality of ports indicated in the registered service's contract, each of the clustered plurality of port graphical objects corresponding to the specified schema-defined message type of the represented corresponding port; and a separate plurality of message graphical objects depicted separate from the clustered pluralities of port graphical objects for each registered services, each of the separate plurality of message graphical objects depicted on a route between a sending port graphical object, from among the plurality of port graphical objects within one graphical service object, and a receiving port graphical object, from among the plurality of port graphical objects within another different graphical service object, each of the separate plurality of message graphical objects representing a schema-defined message being communicated between corresponding ports of the registered services represented by the sending and receiving port graphical objects respectively so as to indicate the behaviors being utilized at the registered services; and dynamically updating the three-dimensional representation to represent services that are interacting with each other, the dynamic updating including highlighting any port graphical objects for corresponding ports that are participating in the communication of a schema-defined message as depicted by message graphical objects.

25. The computer program product of claim 24 further comprising, enumerating the services that are loaded by communicating with a directory service.

26. The computer program product of claim 25 wherein enumerating the services comprises subscribing for notifications from the directory service.

27. The computer program product of claim 24 further comprising, discovering new services by examining data in packets exchanged between services that are interacting with each other.

28. The computer program product of claim 24 wherein rendering the three-dimensional representation comprises generating a visualization containing at least one visible item representative of each service.

29. The computer program product of claim 24 wherein rendering service graphical object representing the registered service comprises rendering a translucent cube representing the registered service.

30. The computer program product of claim 24 wherein rendering the three-dimensional representation comprises generating a representation of messages communicated between the services.

31. The computer program product of claim 24 wherein rendering the three-dimensional representation comprises generating a visualization containing at least one visible item representative of each service and generating a representation of messages communicated between the services.

32. The computer program product of claim 29 wherein rendering a clustered plurality of graphical port objects within a graphical service object comprises rendering a clustered plurality of spheres of a first size within the translucent cube.

33. The computer program product of claim 24 wherein rendering the three-dimensional representation comprises creating a visual collection service to handle calculations and spatial placements for each visible item representative of each service.

34. The computer program product of claim 32 wherein rendering a separate plurality of message graphical objects separate from the clustered pluralities of port graphical objects comprises rendering a plurality of spheres of a second smaller size, each sphere of the second smaller size representing a message being exchanged between ports represented by spheres of the first size.

35. The computer program product of claim 24 wherein dynamically updating the three-dimensional representation to represent services that are interacting with each other comprises sending update messages to provide a dynamic real-time visualization of message movement between items representing interacting services.

36. The computer program product of claim 24 wherein rendering the three-dimensional representation comprises rendering a background surface that creates an impression of a three-dimensional view.

37. The computer program product of claim 24 further comprising, receiving commands from a user directed towards user-interaction with the three-dimensional representation.

38. The computer program product of claim 24 wherein the commands correspond to navigational commands.

39. The computer program product of claim 24 wherein at least one of the commands corresponds to a request to select an entity represented in the three-dimensional representation.

* * * * *